US009234377B2

(12) United States Patent  
Schatz et al.

(10) Patent No.: US 9,234,377 B2  
(45) Date of Patent: Jan. 12, 2016

(54) POWERED GARAGE DOOR OPENER

(71) Applicant: Magna Closures Inc., Newmarket (CA)

(72) Inventors: Kurt Schatz, Uxbridge (CA); J.R. Scott Mitchell, Newmarket (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 14/309,996

(22) Filed: Jun. 20, 2014

(65) Prior Publication Data

US 2015/0007500 A1  Jan. 8, 2015

Related U.S. Application Data

(60) Provisional application No. 61/843,080, filed on Jul. 5, 2013, provisional application No. 61/897,899, filed on Oct. 31, 2013.

(51) Int. Cl.  
*E05F 15/16* (2006.01)  
*F16H 19/02* (2006.01)  
(Continued)

(52) U.S. Cl.  
CPC ............. *E05F 15/1607* (2013.01); *E05F 15/60* (2013.01); *E05F 15/668* (2013.01);  
(Continued)

(58) Field of Classification Search  
CPC .................. E05Y 2900/106; E05Y 2201/214; E05Y 2201/238; E05Y 2201/244; E05Y 2201/22; E05F 15/1607; E05F 15/60; E05F 15/668; E05B 3/44; F16H 19/02; E06B 5/00  
USPC ............. 49/197, 199; 160/188, 189, 190, 201  
See application file for complete search history.

(56) References Cited

U.S. PATENT DOCUMENTS 4,055,023 A   10/1977  Gatland et al.  
4,191,237 A *  3/1980  Voege ........................... 160/188  
(Continued)

FOREIGN PATENT DOCUMENTS

EP     405059 A    1/1991  
EP    1304442 A2   4/2003  
(Continued)

OTHER PUBLICATIONS

European Search Report mailed Dec. 12, 2014 (EP14002228).  
(Continued)

*Primary Examiner* — Katherine Mitchell  
*Assistant Examiner* — Justin Rephann  
(74) *Attorney, Agent, or Firm* — Dickinson Wright PLLC

(57) ABSTRACT

A powered garage door opener is provided for operating a garage door between an open and closed position. The powered garage door opener comprises a main housing mounted adjacent the garage door. An electric motor and gear train assembly is mounted within the main housing and coupled to the garage door to drive the garage door between the open and closed positions. A power supply is mounted within the main housing and electrically connected to the electric motor and gear train assembly. A control module is mounted within the main housing and electrically connected to the power supply and the electric motor and gear train assembly for controlling selective actuation of the electric motor and gear train assembly. The electric motor and gear train assembly includes a secondary housing, an electric motor sealed within the secondary housing, a worm gear coupled to and driven by the electric motor, a spur gear in meshed engagement with the worm gear, and a driven shaft mounted to the spur gear and coupled to garage door. The electric motor provides electrical power to drive the worm and spur gears, rotating the driven shaft, to provide power actuation of the garage door and the gear relationship between the worm gear and spur gear allows the spur gear to back drive the worm gear and provide manual actuation of the garage door.

15 Claims, 8 Drawing Sheets

(51) Int. Cl.
  *E05F 15/18* (2006.01)
  *E06B 5/00* (2006.01)
  *E06B 3/44* (2006.01)
  *E05F 15/60* (2015.01)
  *E05F 15/668* (2015.01)

(52) U.S. Cl.
  CPC .. *E06B 3/44* (2013.01); *E06B 5/00* (2013.01); *F16H 19/02* (2013.01); *E05Y 2201/10* (2013.01); *E05Y 2201/702* (2013.01); *E05Y 2201/71* (2013.01); *E05Y 2201/716* (2013.01); *E05Y 2400/32* (2013.01); *E05Y 2600/458* (2013.01); *E05Y 2800/00* (2013.01); *E05Y 2800/112* (2013.01); *E05Y 2900/106* (2013.01)

(56) References Cited

U.S. PATENT DOCUMENTS

| | | | |
|---|---|---|---|
| 4,900,294 A | 2/1990 | Schneeberger | |
| 5,063,316 A * | 11/1991 | E-Ming | 310/83 |
| 5,222,327 A | 6/1993 | Fellows et al. | |
| 5,233,879 A | 8/1993 | Watanuki et al. | |
| 5,239,776 A | 8/1993 | Lhotak | |
| 5,557,887 A * | 9/1996 | Fellows et al. | 49/28 |
| 5,572,829 A | 11/1996 | Stoltenberg | |
| 5,698,073 A * | 12/1997 | Vincenzi | 160/188 |
| 6,173,532 B1 | 1/2001 | Beausoleil | |
| 6,327,744 B1 * | 12/2001 | Dorma | 16/197 |
| 6,400,112 B1 | 6/2002 | Fitzgibbon et al. | |
| 6,408,925 B1 * | 6/2002 | Dorma | 160/191 |
| 6,605,910 B2 | 8/2003 | Mullet et al. | |
| 6,667,591 B2 | 12/2003 | Mullet et al. | |
| 6,719,033 B2 | 4/2004 | Stoltenberg | |
| 6,879,122 B1 | 4/2005 | Stewart et al. | |
| 6,883,579 B2 | 4/2005 | Olmsted | |
| 7,076,917 B2 | 7/2006 | Chang | |
| 7,116,100 B1 * | 10/2006 | Mock et al. | 324/207.25 |
| 7,117,972 B2 | 10/2006 | Mattson et al. | |
| 7,192,066 B2 | 3/2007 | Ilea et al. | |
| 7,252,018 B2 | 8/2007 | Hormann | |
| 7,311,130 B2 | 12/2007 | Hoermann | |
| RE40,001 E | 1/2008 | Siegler et al. | |
| 7,382,063 B2 | 6/2008 | Mullet et al. | |
| 7,576,504 B2 | 8/2009 | Mullet et al. | |
| 7,607,263 B2 | 10/2009 | Mullet et al. | |
| 7,737,654 B2 | 6/2010 | Anderson | |
| 7,816,879 B2 | 10/2010 | Taheri et al. | |
| 8,025,090 B2 | 9/2011 | Kicher | |
| 8,100,163 B2 | 1/2012 | Nicholson | |
| 8,122,645 B2 | 2/2012 | Theile et al. | |
| 8,209,906 B2 | 7/2012 | Romich | |
| 8,327,908 B2 | 12/2012 | Godovalov | |
| 8,371,356 B2 | 2/2013 | Manser | |
| 8,375,635 B2 | 2/2013 | Hellinga et al. | |
| 8,397,787 B1 * | 3/2013 | Daus et al. | 160/9 |
| 2002/0175276 A1 * | 11/2002 | Smith et al. | 250/231.13 |
| 2003/0075288 A1 * | 4/2003 | Mullet | 160/189 |
| 2003/0192657 A1 * | 10/2003 | Mullet et al. | 160/188 |
| 2004/0177934 A1 | 9/2004 | Olmsted | |
| 2006/0049021 A1 * | 3/2006 | Scheib et al. | 192/139 |
| 2006/0090861 A1 | 5/2006 | Wu | |
| 2006/0191205 A1 * | 8/2006 | Mullet et al. | 49/199 |
| 2006/0237150 A1 | 10/2006 | Olmsted | |
| 2007/0000622 A1 * | 1/2007 | Reed et al. | 160/188 |
| 2007/0051477 A1 * | 3/2007 | Fraser et al. | 160/84.05 |
| 2009/0115366 A1 * | 5/2009 | Mullet et al. | 318/466 |
| 2009/0288506 A1 | 11/2009 | Larsen et al. | |
| 2010/0096092 A1 | 4/2010 | Liu et al. | |
| 2010/0156182 A1 | 6/2010 | Mertel et al. | |
| 2012/0000304 A1 * | 1/2012 | Hamminga et al. | 74/89.23 |
| 2012/0125545 A1 * | 5/2012 | Ehrlich | 160/229.1 |
| 2013/0314019 A1 * | 11/2013 | Wilmes | 318/470 |

FOREIGN PATENT DOCUMENTS

| | | |
|---|---|---|
| EP | 1094247 B1 | 6/2006 |
| FR | 2919659 A1 | 2/2009 |
| GB | 2245389 A | 1/1992 |
| WO | 9400665 A | 1/1994 |
| WO | 9918318 A1 | 4/1999 |
| WO | 2009094038 A1 | 7/2009 |

OTHER PUBLICATIONS

International Search Report mailed Feb. 3, 1999 (PCT/DE98/002951).

* cited by examiner

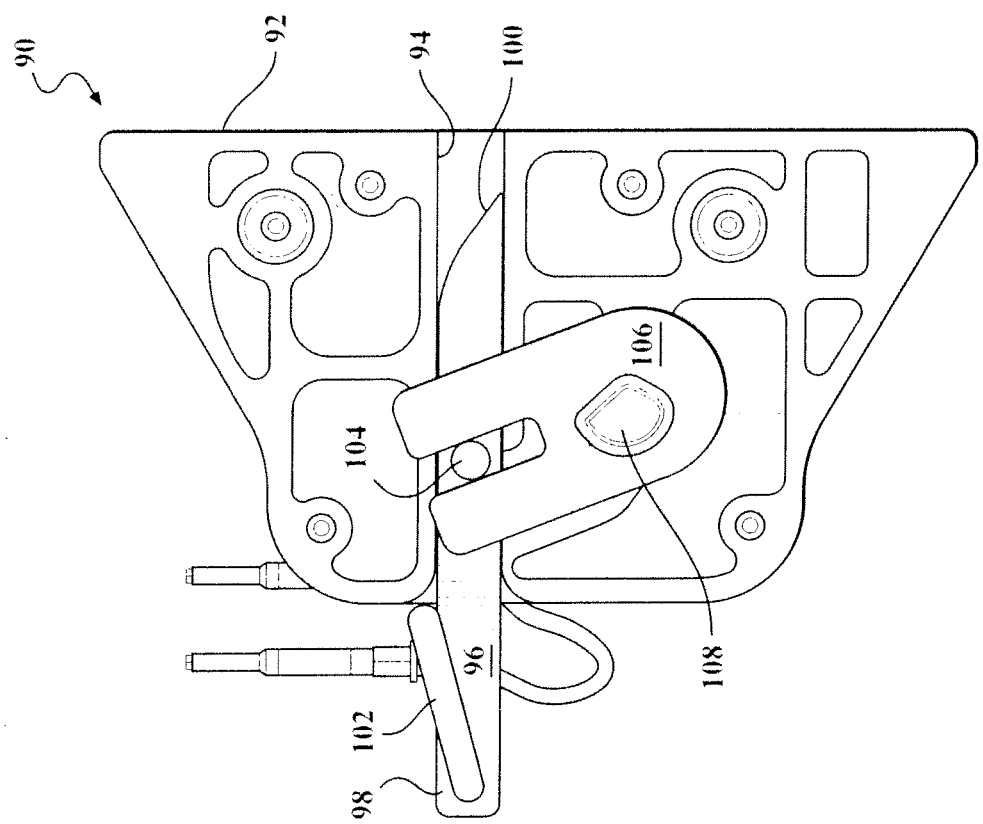
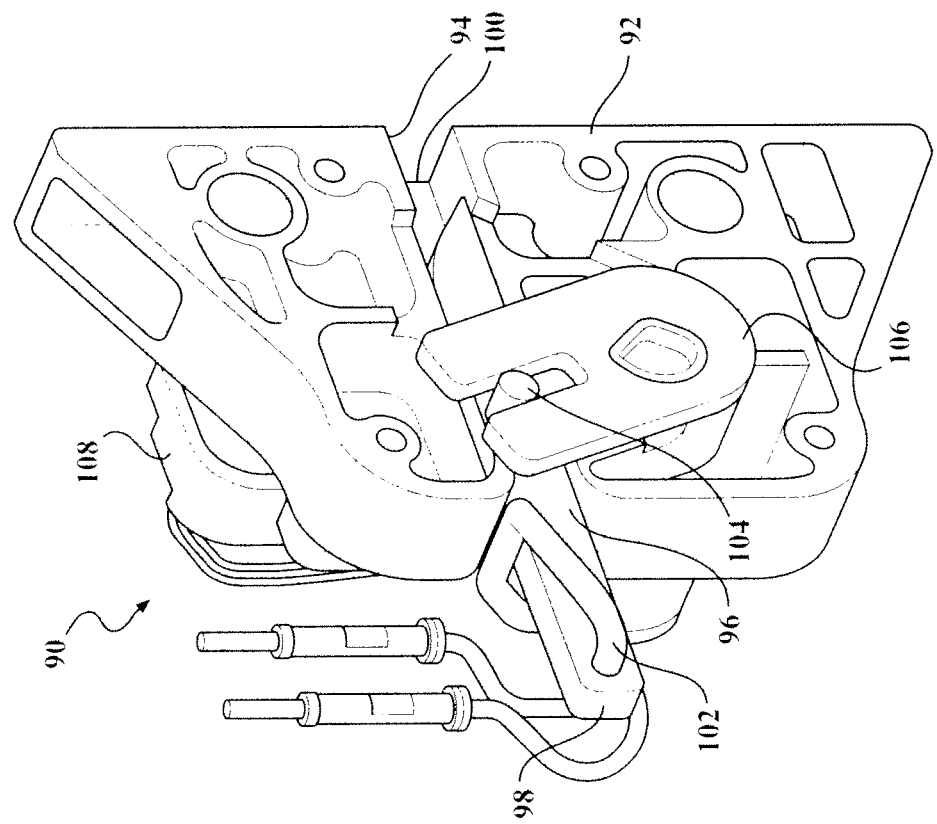
FIG. 8
FIG. 7

POWERED GARAGE DOOR OPENER

CROSS REFERENCE TO RELATED APPLICATION

This application claims priority to and the benefit of U.S. Provisional Application No. 61/843,080 filed Jul. 5, 2013 and U.S. Provisional Application No. 61/897,899 filed Oct. 31, 2013. The entire disclosure of each of the above applications is incorporated herein by reference.

BACKGROUND OF THE INVENTION

1. Field of the Invention

The present invention relates to a powered garage door opener for powering a garage door between an open and closed position. More particularly, the present invention relates to an electric powered garage door opener having a back drivable electric motor and gear train assembly to provide both powered and manual operation of the garage door between the open and closed positions.

2. Description of Related Art

Garage door openers of the type mounted overhead along the ceiling of a garage are commonly known. These overhead type garage door openers are typically electrically powered and include a screw, belt or chain drive attached directly to the top garage door panel for driving the garage door between an open and closed position. However, overhead type garage door openers are relatively large in size, consume a significant amount of ceiling space within the garage and are difficult to install.

More recently, side mounted or torsion bar mounted garage door openers have become known which mount to the wall adjacent the garage door and couple directly to the rotating torsion bar or shaft supporting the garage door. These side mounted openers are directly coupled to the shaft and rotate the shaft in opposing directions to drive the garage door between the open and closed positions. However, current side mounted garage door openers include complex gear train assemblies driven by large motors to provide sufficient AC powered torque to rotate the shaft and operate the garage door between the open and closed positions.

It is desirable, therefore, to provide an electrically powered garage door opener having a sealed housing and including an electric DC motor and gear train assembly which can power the garage door between the open and closed position and also be back driven to allow manual operation of the door.

SUMMARY OF THE INVENTION

According to one aspect of the invention, a powered garage door opener is provided for operating a garage door between an open and closed position. The powered garage door opener comprises an electric motor and gear train assembly operatively coupled to the garage door to drive the garage door between the open and closed positions. A power supply is electrically coupled to the electric motor and gear train assembly. A control module is electrically coupled to the power supply and the electric motor and gear train assembly for controlling selective actuation of the electric motor and gear train assembly. The electric motor and gear train assembly includes an electric motor, a worm gear coupled to and driven by the electric motor, a spur gear in meshed engagement with the worm gear and a driven shaft mounted to the spur gear and adapted to be coupled to the garage door. The electric motor provides electrical power to drive the worm and spur gears rotating the driven shaft to provide power actuation of the garage door and wherein the gear relationship between the worm gear and the spur gear allows the spur gear to back drive the worm gear and provide manual actuation of the garage door assembly.

According to another aspect of the invention, a powered garage door opener for operating a garage door between an open and closed position. The powered garage door opener comprises a main housing adapted to be mounted adjacent the garage door. An electric motor and gear train assembly is mounted within the main housing and operatively coupled to the garage door assembly to drive the garage door between the open and closed positions. A power supply is mounted within the main housing and electrically coupled to the electric motor and gear train assembly. A control module is mounted within the main housing and electrically coupled to the power supply and the electric motor and gear train assembly for controlling selective actuation of the electric motor and gear train assembly. The electric motor and gear train assembly includes a secondary housing, an electric motor housed within the secondary housing, a worm gear coupled to and driven by the electric motor, a spur gear in meshed engagement with the worm gear and a driven shaft mounted to the spur gear and adapted to be coupled to garage door. The electric motor provides electrical power to drive the worm and spur gears rotating the driven shaft to provide power actuation of the garage door and wherein the secondary housing isolates and seals the electric motor within the main housing.

BRIEF DESCRIPTION OF THE DRAWINGS

Advantages of the present invention will be readily appreciated as the same becomes better understood by reference to the following detailed description when considered in connection with the accompanying drawings wherein:

FIG. 7 is a perspective view of the lock assembly in an unlocked condition;

FIG. 8 is a side view of the lock assembly in the unlocked condition;

DETAILED DESCRIPTION OF THE EMBODIMENTS

Referring to the Figures, wherein like numerals indicate like or corresponding parts throughout the several views, a powered garage door opener according to one embodiment of the invention is generally shown at 10 for opening and closing a garage door generally shown at 12. An upright planar garage wall 14 defines a garage opening 16 which is opened and closed by the garage door 12.

Figure 1:
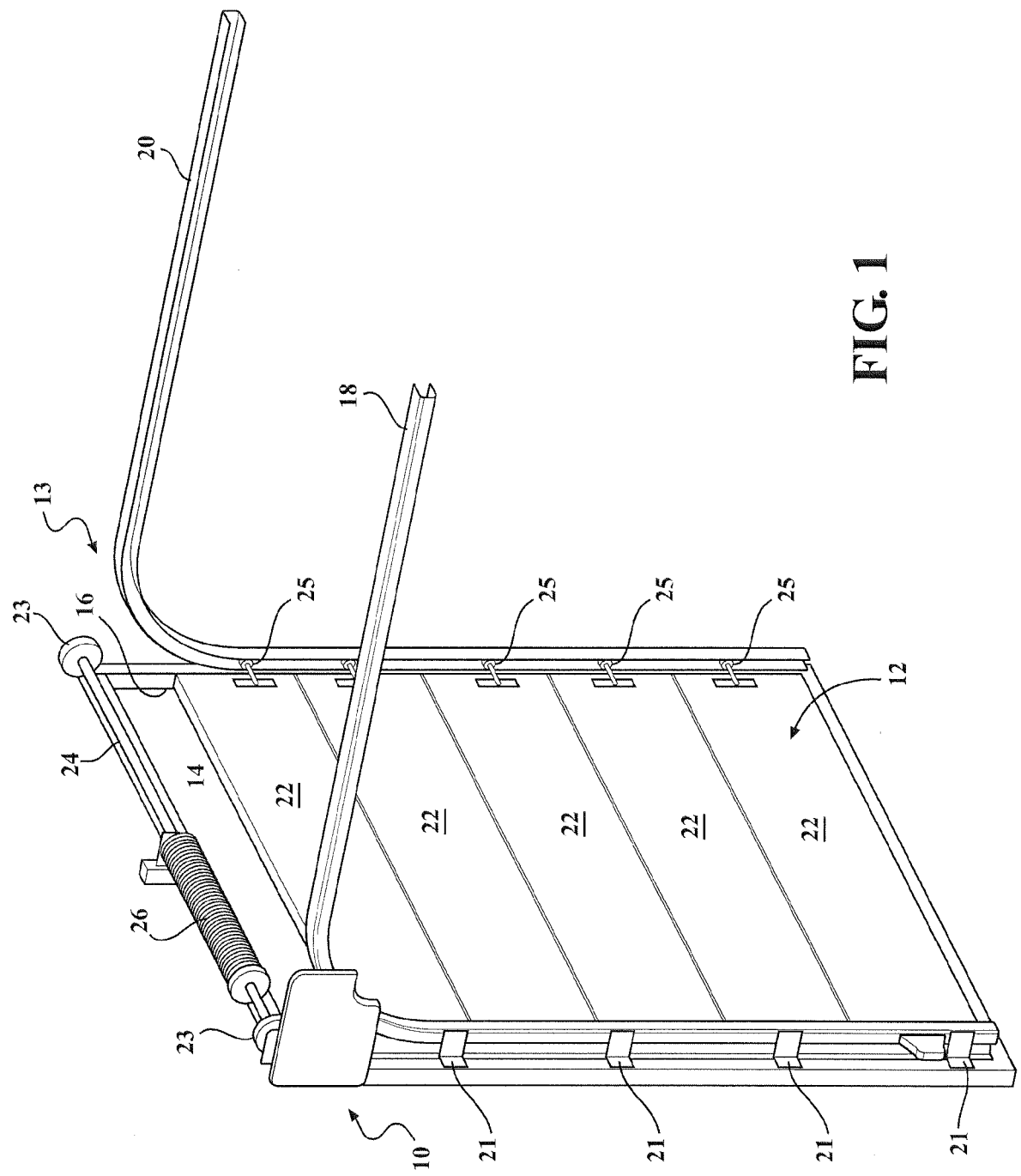
FIG. 1 is a perspective view of a powered garage door opener operatively coupled to a shaft of a garage door assembly and a lock assembly operatively coupled to a garage door guide track according to one embodiment of the invention.

Referring to FIG. 1, garage door assembly 12 is part of a garage door assembly 13 which includes a pair of parallel and spaced apart guide tracks 18, 20 fixedly secured by brackets 21 to the garage wall 14 along opposing sides of the opening 16. The garage door 12 includes a plurality of garage door panels 22 that are pivotally interconnected along their longitudinal sides by a plurality of pivot brackets and are coupled to the guide tracks 18, 20 along their lateral sides by a plurality of roller wheels 25. The garage door assembly 13 also includes an elongated shaft 24 that is rotatably coupled to the garage wall 14 above the opening 16 and extends between opposite distal ends, with each supporting a pulley 23. A cable is wound around each pulley 23 and includes a first end fixed to the pulley 23 and a second end fixed to the bottom door panel 22 for guiding the door panels 22 along the guide tracks 18, 20 upon rotation of the shaft 24 and moving the garage door 12 between a closed position covering the opening 16 and an open position spaced above the opening 16. A torsion spring 26 is wound about the shaft 24 for assisting rotation of the shaft 24 and raising the door panels 22 to the open position. The torque on the torsion spring 26 may be adjusted at the time of installation to adjust the assist in raising the door 12 or stopping door movement at all positions between open and closed as desired.

Figure 2:
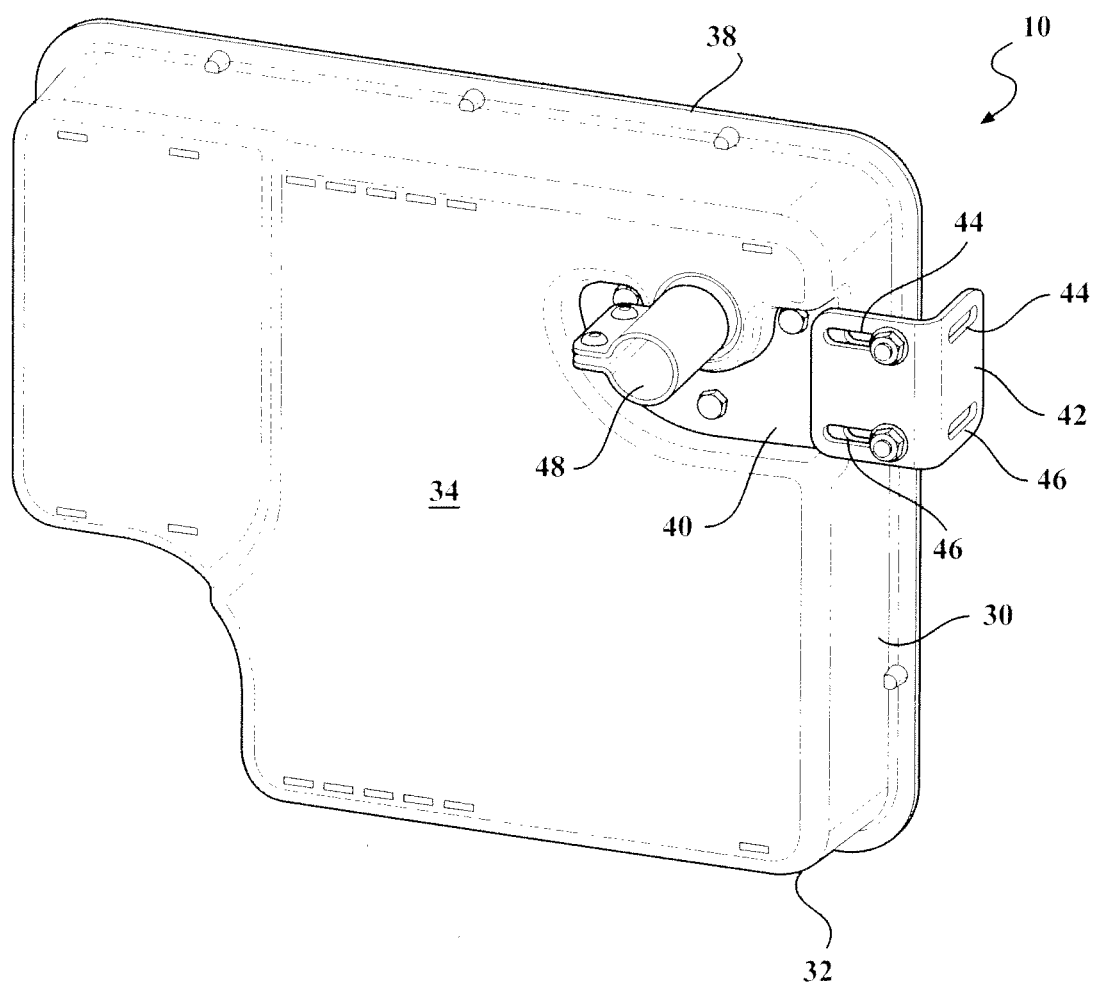
FIG. 2 is a rear perspective view of the powered garage door opener of FIG. 1.
Figure 3:
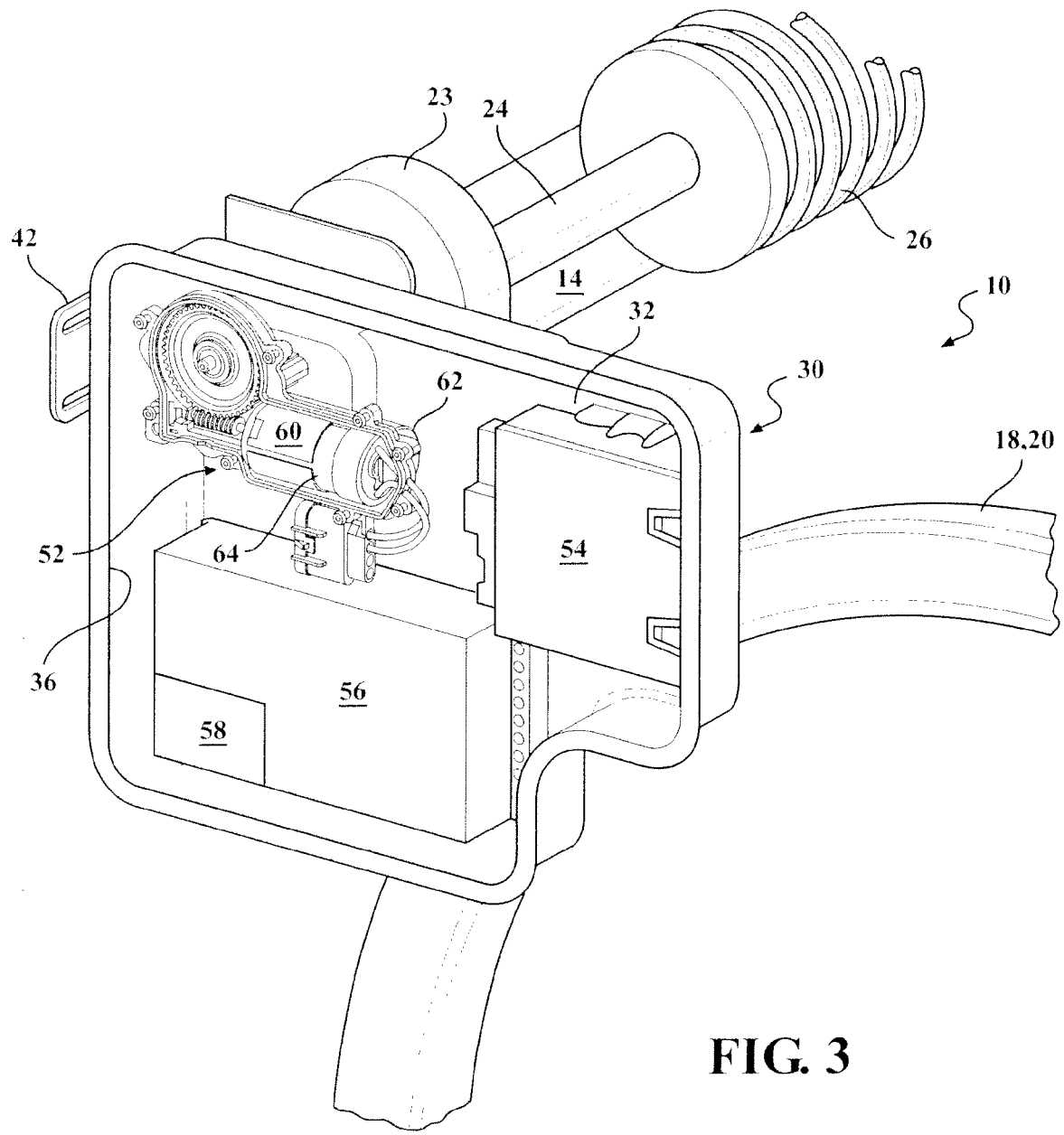
FIG. 3 is a partial perspective view of the powered garage door opener operatively coupled to the shaft of the garage door assembly and with a housing cover removed.
Figure 4:
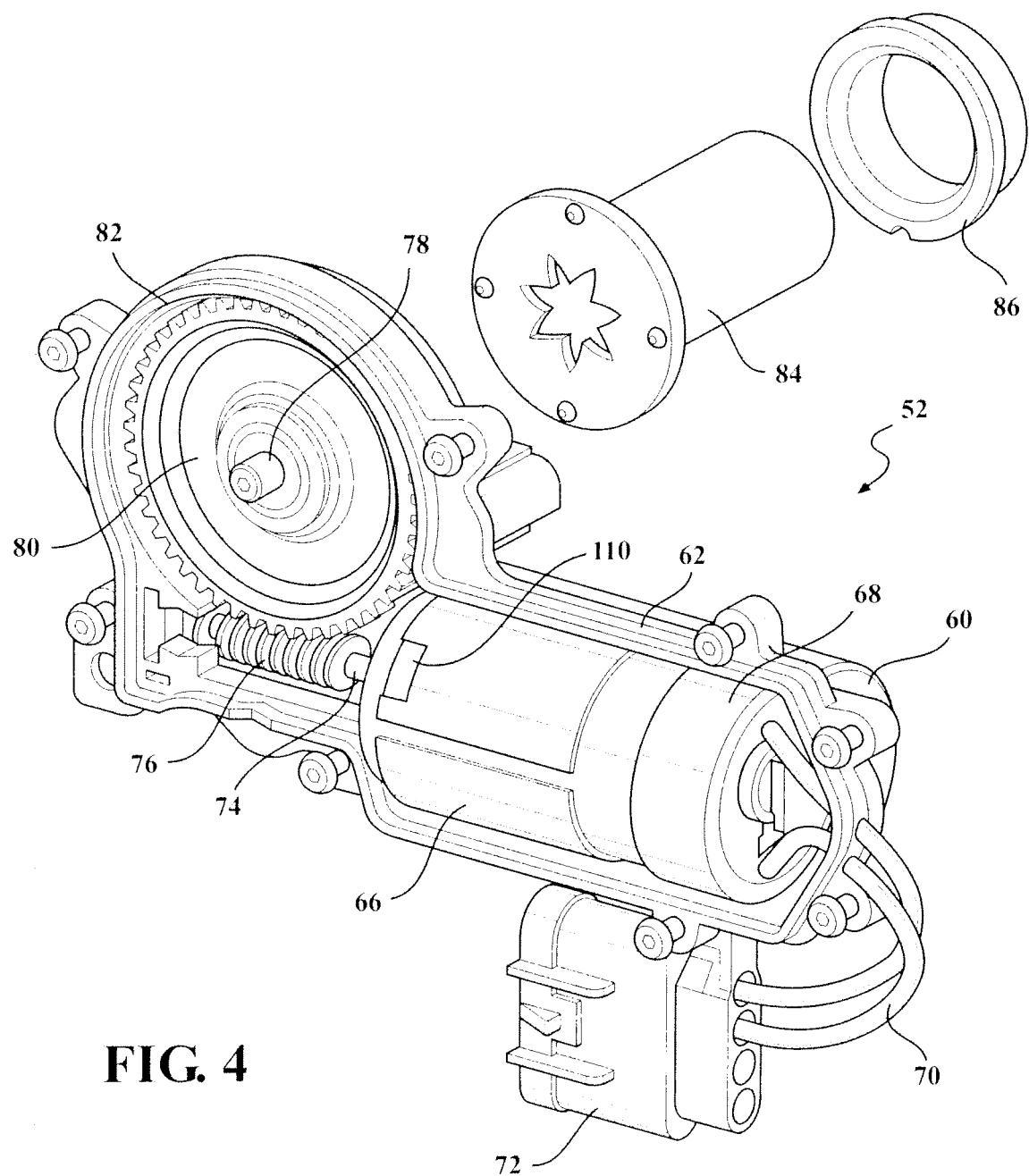
FIG. 4 is a partially exploded perspective view of a motor assembly of the powered garage door opener with a motor housing cover removed.

The powered garage door opener 10 is fixedly mounted to the garage wall 14 adjacent the opening 16 and operatively coupled to one end of the shaft 24 for rotating the shaft 24 and facilitating actuation of the garage door 12 between the open and closed positions. Referring to FIGS. 2-4, the powered garage door opener 10 comprises an outer housing 30 of plastic or metal. The outer housing 30 includes a bin 32 forming a cavity extending from a bottom side 34 to a front opening 36 and a cover 38 for covering the front opening 36 of the bin 32. A metal or plastic housing attachment bracket 40 is fixedly attached to the bottom side 34 of the bin 32 by bolts or the like. A metal or plastic adjustable L-shaped bracket 42 is mounted to the attachment bracket 40 for mounting the garage door opener 10 to the garage wall 14 adjacent the garage door assembly 13, as shown in FIG. 1. Each leg of the L-shaped bracket 42 includes a pair of elongated slots 44, 46 for receiving mounting bolts therethrough and provides alignment adjustment for mounting of the garage door opener 10 to the garage wall 14. Additionally, a shaft coupling 48 projects from the bottom side 34 of the bin 32 for coupling a driven shaft 84 of the garage door opener 10 to one of the distal ends of the garage door shaft 24 as will be described in further detail below.

Referring to FIG. 3, the garage door opener 10 is shown mounted to the garage wall 14 adjacent the garage door assembly 13 and operatively coupled to the shaft 24. The cover 38 of the outer housing 30 has been removed to disclose the cavity of the bin 32. The bin 32 houses an electric motor and gear train assembly 52 operatively coupled to the shaft 24, an electronic control module 54 electrically connected to the electric motor and gear train assembly 52, and a power supply 56 electrically connected to the electronic control module 54 and the electric motor and gear train assembly 52 for providing power thereto. More specifically, the power supply 56 is a 12V DC output power supply which may be powered by a standard household AC outlet on the garage wall 14. The power supply 56 may also include a 12V DC 12 amp battery or other energy storage device 58, such as capacitors to provide power to the electric motor and gear train assembly 52 in the event of an electrical power failure. The battery or energy storage device 58 may be plugged into the AC outlet with a trickle charger to maintain the battery charge or connected to a solar power system as are commonly known and readily available.

The electronic control module 54 may be software controlled to actuate the electric motor and gear train assembly 52 and rotate the shaft 24 to drive the garage door panels 22 between the open and closed positions. The electronic control module 54 may be controlled remotely by a wireless vehicle controller, a wired or wireless controller mounted to the garage wall 14, a wireless key fob-type controller, a mobile phone/smart phone application, or any other type of transmitter for providing a control signal to the module 54.

Referring to FIGS. 3 and 4, the electric motor and gear train assembly 52 comprises a sealed motor and gear housing 60 which is fixedly mounted within the cavity of the bin 32 of the outer housing 30. In this manner, the electric motor and gear train assembly 52 is separately isolated and sealed within its housing 60 and within the outer housing 30. The sealed housing 60 provides a completely greased, sealed, and maintenance free assembly of the motor and gear train assembly 52 isolated and secured within the outer housing 30. Further, isolating and sealing the motor and gear train assembly 52 within its housing 60 from the outer housing 30 allows for air flow within the outer housing 30 to cool the electric control module 54 and power supply 56. The motor and gear housing 60 includes a body 62 defining a cavity and a cover 64 for covering the body 62 and closing the cavity. FIG. 4 shows the motor and gear train assembly 52 with the cover 64 removed. A 12V DC motor 66 is secured in a cylindrical portion of the body 62 by a rubber vibration damper strap or sleeve 68 to isolate noise and vibration from the motor 66 within the housing 60. An electrical wiring harness 70 and coupling 72 extend from one end of the motor 66 and through the housing 60 for electrical connection to the electronic control module 54 and power supply 56. A motor shaft 74 extends from the opposite end of the motor 66 and supports a single stage worm gear 76, which is preferably made of bronze. A gear shaft 78 extends through the bottom of the body 62 and rotatably supports a spur or wheel gear 80, which is preferable made of plastic. The brass worm gear 76 and plastic wheel gear 80 achieve a low coefficient of friction for back driving while meeting strength requirements for durability. The spur gear 80 includes outer peripheral teeth 82 in meshed engagement with the worm gear 76 whereby rotation of the worm gear 76 by the motor 66 causes rotation of the spur gear 80 and gear shaft 78. The gear ratio between the worm gear 76 and the spur gear 80 is preferably 57:1 to allow the worm gear 76 to be manually back driven by the spur gear 80 during manual operation of the garage door assembly 12. The worm gear lead angle also allows the worm gear 76 to be manually back driven by the spur gear 80. It should be appreciated that other gear ratios may be selected which will also allow the worm gear 76 to be back driven by the spur gear 80. Additionally, the use of a bronze worm gear 76 and a plastic spur gear 80 provides for low sound output during operation of the motor 66 and driving of the gears 76, 80. A metal driven shaft 84 and plastic or bronze bushing 86 are secured to the gear shaft 78 for rotation therewith. Finally, the shaft coupling 48 interconnects the driven shaft 84 and the garage door shaft 24 such that actuation of the motor 66 facilitates rotation of the garage door shaft 24 and movement of the door panels 22 between the open and closed positions.

Figure 6:
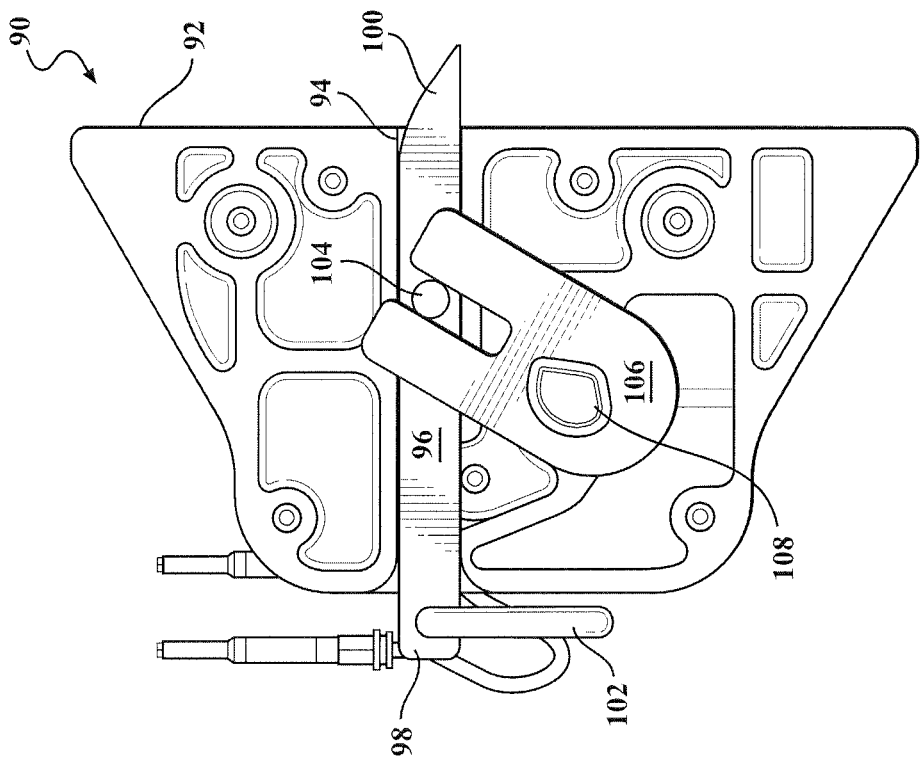
FIG. 6 is a side view of the lock assembly in the locked condition.
Figure 5:
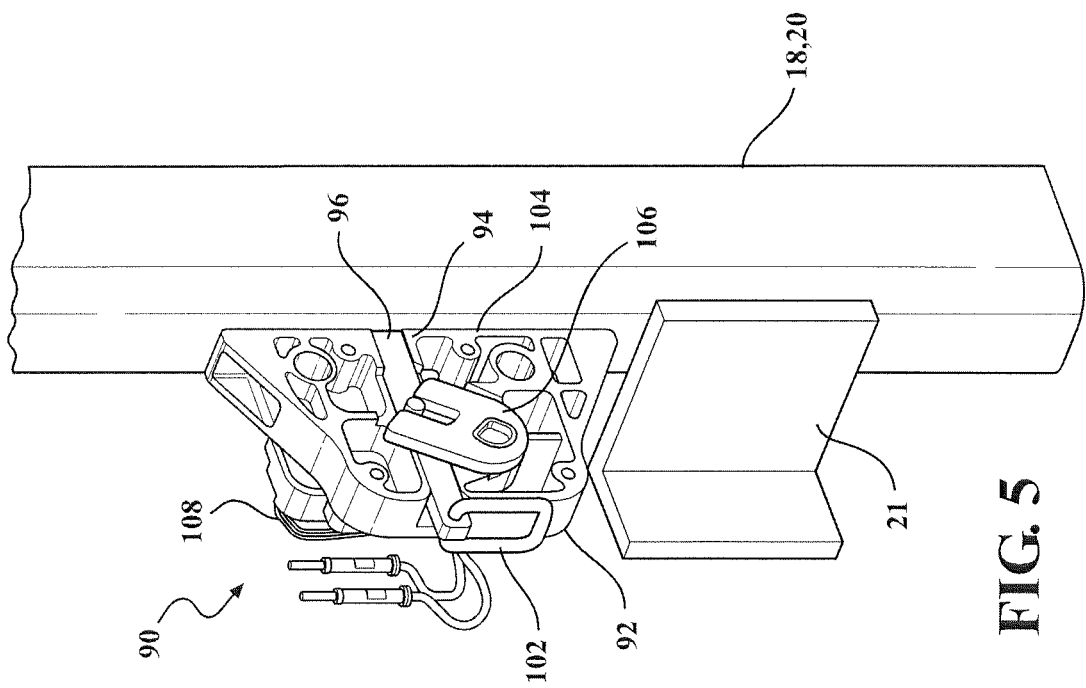
FIG. 5 is a perspective view of the lock assembly operatively coupled to the guide track in a locked condition.

Referring to FIGS. 5-8, the powered garage door opener 10 further includes a lock assembly 90 to enable locking and unlocking of the garage door assembly 12 in the closed position. The lock assembly 90 includes a carriage 92 for mounting the lock assembly 90 to one of the tracks 18, 20 adjacent the bottom door panel 22. The carriage 92 includes a lateral through-bore 94 for slidably receiving and guiding an elongated sliding bar 96 therein. The sliding bar 96 extends longitudinally between a first end 98 and an opposite second tapered or ramped second end 100. A release ring 102 is coupled to the first end 98 for manually sliding the slide bar 96 through the bore 94. A guide pin 104 projects laterally from the sliding bar 96. A fork arm 106 extends between a first end pivotally coupled to the carriage 92 and an opposite U-shaped second end slidably coupled to the guide pin 104. An electric spring loaded solenoid actuator 108 is operatively coupled to the fork arm 106 and electrically connected to the electronic control module 54 and power supply 56 for actuating the lock assembly 90 between a locked condition, as shown in FIGS. 5 and 6, wherein the sliding bar 96 engages one of the wheels on the garage door panels 22 to lock the door panels 22 in the closed position and an unlocked condition, as shown in FIGS. 7 and 8, wherein the sliding bar 96 is retracted and disengaged from the wheel to unlock the door panels 22 and allow movement to the open position.

In operation, with the garage door assembly 12 in the closed position and the lock assembly 90 in the locked condition, a mobile phone or other wired or wireless transmitter may be pressed to actuate the powered garage door opener 10. The transmitter sends a signal to the electronic control module 54 to open the garage door assembly 12. The module 54 powers and activates the solenoid actuator 108 to pivot the fork arm 106 counterclockwise, as shown in the Figures, retracting and disengaging the sliding bar 96 from one of the wheels 25 and maintaining the lock assembly 90 in the unlocked condition. The module 54 and power supply 56 further then powers the motor 66 to rotate the worm gear 76 and spur gear 80. The driven shaft 84 extending from the spur gear 80 is coupled to the garage door shaft 24 via the coupling 48 to transfer the torque from the driven shaft 84 to rotation of the shaft 24. The torsion spring 26 assists in the rotation of the shaft 24 and the pulleys 23 wind the cables to the slide the garage door panels 22 along the tracks 18, 20 from the closed position to the open position.

The motor 66 may also include a sensor or encoder 110 to monitor and determine the position and speed of the garage door panels 22 and define the open and closed positions. The sensor or encoder 110 along with software within the control module 54 allows for adjustment and control of the speed and position of the door panels 22 as well as the ability to determine if an obstacle is present within the opening or blocking the path of the door panels 22 during operation of the door. The sensor or encoder along with the software within the control module 54 may also vary the speed of the motor 66 to slowly accelerate and/or decelerate the door panels 22 and vary the travel of the door panels 22 for different sized garage door openings. The garage door assembly 13 may alternatively include an infrared sensor system attached to the garage door tracks 18, 20 to detect the presents of an obstacle or an ultrasonic sensor or pinch strip mounted to the bottom panel 22 of the garage door 12. An obstacle can be detected by the sensor detecting no movement of the garage door 12 when the garage door opener 10 is being driven. Other obstacle detection techniques such as sensing motor current, or optical, ultrasound, or capacitive sensing in the plane of the door can be used.

Additionally, in the event of an electrical power failure, the motor 66 may be powered and driven by the backup battery power supply 58.

The garage door 12 may also be moved manually between the open and closed positions without decoupling or damaging the powered garage door opener 10. In manual operation, the release ring 102 is pulled to retract and disengage the sliding bar 96 from one of the wheels 25 and then rotated upwardly and wedged against the carriage 92 to lock the lock assembly 90 in the unlocked condition, as shown in FIGS. 7 and 8. Manually lifting of the door panels 22 rotates the main shaft 24, with assistance by the torsion spring 26. The lead angle of the worm gear 76 and/or the gear ratio between the worm gear 76 and spur gear 80 allows the rotation of the main shaft 24 to be transferred to the driven shaft 82 to safely back drive the worm gear 76 without damaging the gears 76, 80 or the motor 66. Alternatively, the control module 54 may be programmed to operate in a hybrid power lift assist mode wherein the user manually operates the door between the open and closed positions and the powered garage door opener 10 actuates the motor 66 to provide additional lift assistance to the door panels 22 thereby reducing the effort required to operate the garage door 12 between the open and closed positions. Because the garage door opener 10 is back drivable, the opener 10 is more mechanically efficient and consumes less power to raise and lower the door 12. The greater efficiency also reduces the package size to do the required work. Additionally, providing a back drivable opener 10 alleviates the need for complex mechanisms for decoupling the motor and gear train assembly in manual operation.

Figure 9:
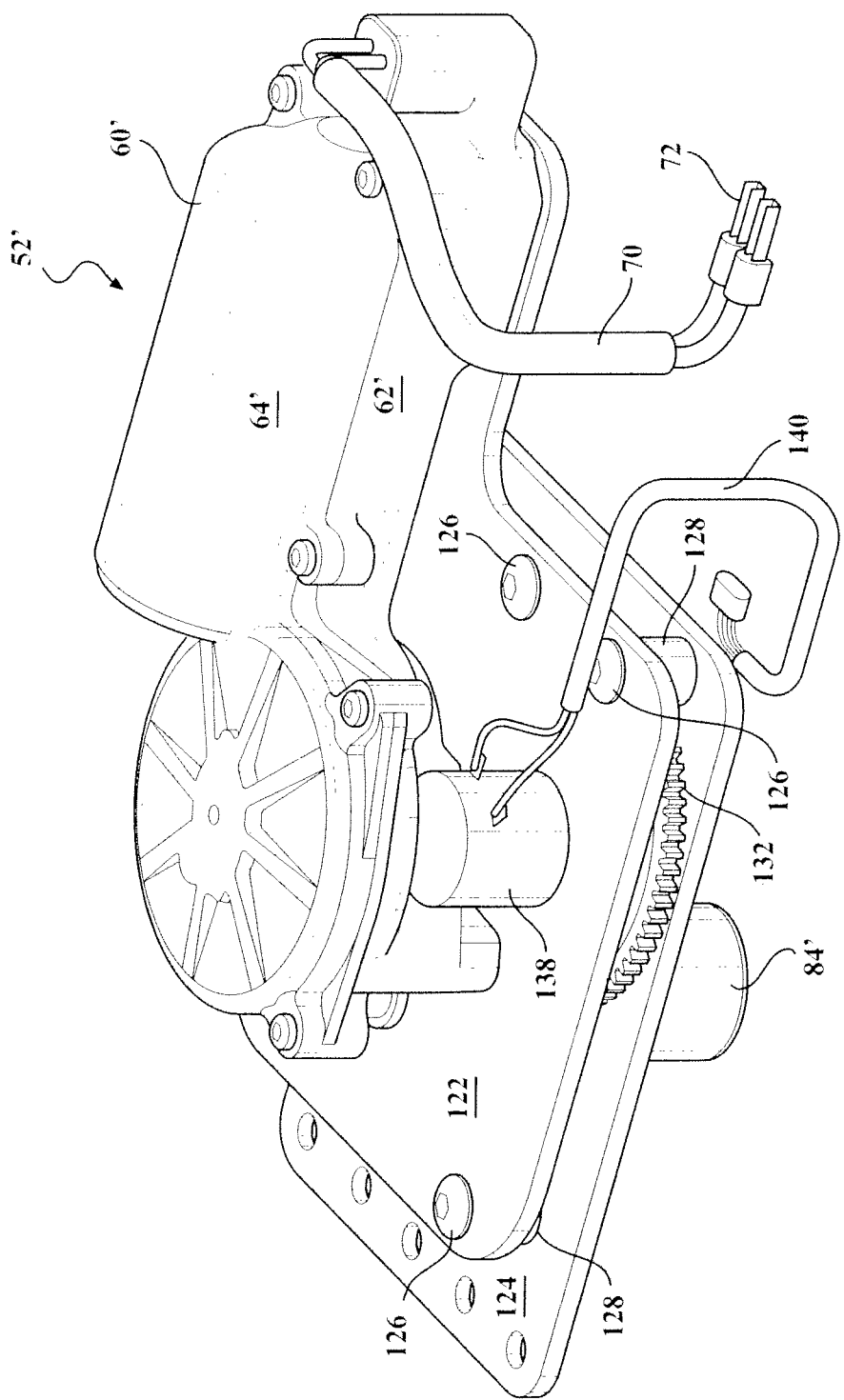
FIG. 9 is a top perspective view of an alternative embodiment of the electric motor and gear train assembly.
Figure 10:
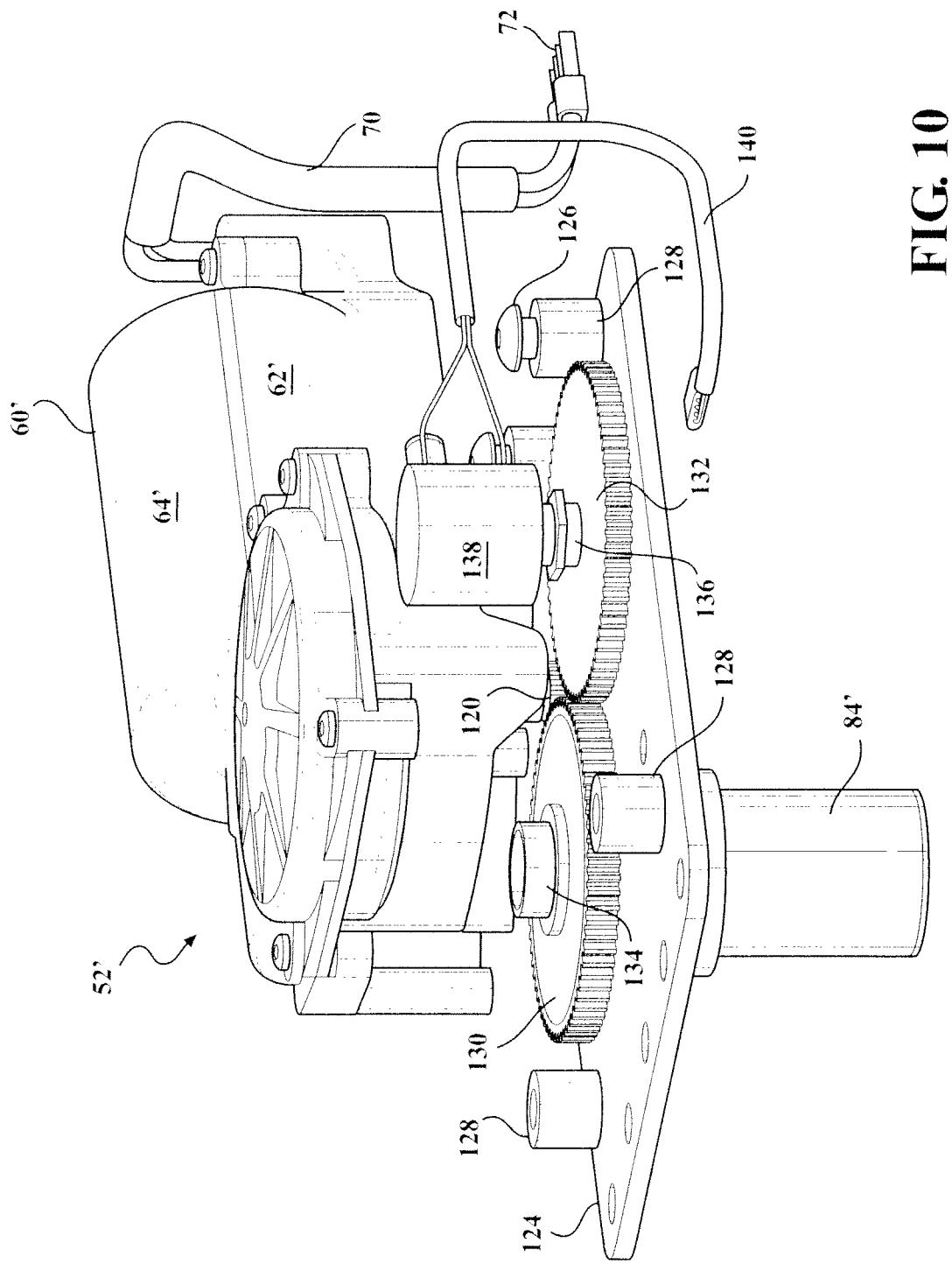
FIG. 10 is a side perspective view of the alternative electric motor and gear train assembly of FIG. 9 with a top gear support plate removed.

Referring now to FIGS. 9 and 10, an alternative embodiment of the electric motor and gear train assembly is shown at 52'. The alternative electric motor and gear train assembly 52' includes a sealed motor and gear housing 60' which is fixedly mounted within the cavity of the bin 32 of the outer housing 30 as in the first embodiment of FIG. 3. The motor and gear housing 60' includes a body 62' defining a cavity and a cover 64' for covering the body 62' and closing the cavity. As in the first embodiment, the motor 66 is secured in the body 62' and the electrical wiring harness 70 and coupling 72 extend from the motor 66 and through the housing 60' for electrical connection to the electronic control module 54 and power supply 56. The motor shaft 74 extending from the motor 66 supports the worm gear 76, which is in meshed engagement with the teeth 82 of the spur gear 80. The spur gear 80 is fixedly supported on the gear shaft 78 as previously discussed and shown in FIG. 4.

In the alternative embodiment, a driven gear 120 is fixedly secured to the opposite distal end of the driven gear shaft 78 on the outside of the housing 60'. The alternative electric motor and gear train assembly 52' includes a pair of spaced apart and parallel first and second gear support plates 122, 124. The first gear support plate 122 (top) is fixedly secured to the housing 60' and the second gear support plate 124 (bottom) is fixedly secured to the first gear support plate 122 by fasteners 126 with spacers 128 supported therebetween to maintain a spaced gap between the plates 122, 124. The first and second gear support plates 122, 124 rotatably support second and third driven spur gears 130, 132 therebetween. The driven gear 120 and second and third spur gears 130, 132 are preferably made of metal to increase the strength and durability of the motor and gear train assembly 52'. Additionally, the ratio between the driven gear 120 and second spur gear 130 is preferably 5:1 which allows use of a high speed motor 66 while reducing the stress on the plastic worm gear 76 and maintaining the strength and durability of the assembly 52'. The second spur gear 130 is rotatably supported on a first end of a shaft 134 extending through the second (or bottom) gear support plate 124. A driven shaft 84' is secured to the opposite second end of the shaft 134 for rotation therewith and interconnected to the garage door shaft 24 by the coupling 48. The teeth of the second spur gear 130 are in meshed engagement with the teeth of the driven gear 120 and thus driven by the motor 66.

The third spur gear 132 is rotatably supported on a first end of a shaft 136 extending through the first (or top) gear support plate 122. A rotary potentiometer 138 is mounted to the opposite second end of the shaft 136 for rotation therewith. The teeth of the third spur gear 132 and in meshed engagement with the teeth of the second spur gear 130.

In operation, the module 54 and the power supply 56 powers the motor 66 to rotate the worm gear 76 and the spur gear 80 as discussed previously in the first embodiment. The driven gear shaft 78 extending from the spur gear 80 drives the driven gear 120. The driven gear 120 then rotatably drives the second spur gear 130. The driven shaft 84' extending from the shaft 134 of the second spur gear 130 is coupled to the garage door shaft 24 via the coupling 48 to transfer the torque from the motor 66 into rotation of the shaft 24, thereby moving the garage door 12 between the open and closed position.

Additionally, the second spur gear 130 simultaneously drives the third spur gear 132, and therefore, the rotary potentiometer 138. The rotary potentiometer 138 is electrically coupled to the control module 54 via electrical connector 140 in order to monitor and maintain the absolute position of the garage door panels 22 between the open and closed position in the event of a power failure.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A powered garage door opener for operating a garage door between an open and closed position, said powered garage door opener comprising:
   an electric motor and gear train assembly adapted to be operatively coupled to the garage door to drive the garage door between the open and closed positions;
   a power supply electrically coupled to said electric motor and gear train assembly;
   a lock assembly configured to operatively engage and disengage the garage door; and
   a control module electrically coupled to said power supply and said electric motor and gear train assembly for controlling selective actuation of said electric motor and gear train assembly, and wherein said control module is operable for selectively shifting said lock assembly between a locked condition wherein said lock assembly operatively engages the garage door and an unlocked condition wherein said lock assembly operatively disengages the garage door and permits movement of the garage door between the closed and open positions;
   wherein said electric motor and gear train assembly includes an electric motor, a worm gear, coupled to and driven by said electric motor, a spur gear in meshed engagement with said worm gear and a driven shaft mounted to said spur gear and adapted to be coupled to the garage door, wherein said electric motor provides electrical power to drive said worm and spur gears for rotating said driven shaft to provide power actuation of the garage door, and wherein the gear relationship between said worm gear and said spur gear allows said spur gear to back drive said worm gear and provide manual actuation of the garage door.

2. The powered garage door opener as set forth in claim 1 further including a main housing adapted to be mounted adjacent the garage door.

3. The powered garage door opener as set forth in claim 2 wherein said electric motor and gear train assembly, said power supply, and said control module are mounted within said main housing.

4. The powered garage door opener as set forth in claim 3 wherein said electric motor and gear train assembly includes a secondary housing mounted within said main housing and said electric motor is sealed within said secondary housing.

5. The powered garage door opener as set forth in claim 1 wherein a gear ratio between said worm gear and said spur gear allows said spur gear to back drive said worm gear for providing said manual actuation of the garage door.

6. The powered garage door opener as set forth in claim 1 wherein a lead angle of said worm gear relative to said spur gear allows said spur gear to back drive said worm gear for providing said manual actuation of the garage door.

7. A powered garage door opener for operating a garage door between an open and closed position, said powered garage door opener comprising:
   a main housing adapted to be mounted adjacent the garage door;
   an electric motor and gear train assembly mounted within said main housing and adapted to be operatively coupled to the garage door assembly to drive the garage door between the open and closed positions;
   a power supply mounted within said main housing and electrically coupled to said electric motor and gear train assembly;
   a lock assembly configured to operatively engage and disengage the garage door; and
   a control module mounted within said main housing and electrically coupled to said power supply and said electric motor and gear train assembly for controlling selective actuation of said electric motor and gear train assembly, and wherein said control module is operable for selectively shifting said lock assembly between a locked condition wherein said lock assembly operatively engages the garage door and an unlocked condition wherein said lock assembly operatively disengages the garage door and permits movement of the garage door between the closed and open positions;
   wherein said electric motor and gear train assembly includes a secondary housing, an electric motor housed within said secondary housing, a worm gear coupled to and driven by said electric motor, a spur gear in meshed engagement with said worm gear, and a driven shaft mounted to said spur gear and adapted to be coupled to garage door, wherein said electric motor provides electrical power to drive said worm and spur gears for rotating said driven shaft to provide power actuation of the garage door, wherein a gear relationship between said worm gear and said spur gear allows said spur gear to back drive said worm gear and provide manual actuation of the garage door, and wherein said secondary housing isolates and seals said electric motor within said main housing.

8. The powered garage door opener as set forth in claim 7 wherein a gear ratio between said worm gear and said spur gear allows said spur gear to back drive said worm gear for providing said manual actuation of the garage door.

9. The powered garage door opener as set forth in claim 7 wherein a lead angle of said worm gear relative to said spur gear allows said spur gear to back drive said worm gear for providing said manual actuation of the garage door.

10. The powered garage door opener as set forth in claim 7 further including a driven gear and a second spur gear in meshed engagement with said driven gear, said second spur gear being rotatably supported on a second shaft secured to said driven shaft for rotation therewith.

11. The powered garage door opener as set forth in claim 10 further including a potentiometer operatively coupled to said second spur gear for monitoring the rotational position of said second spur gear.

12. The powered garage door opener as set forth in claim 11 further including a third spur gear is meshed engagement with said second spur gear for rotation therewith, wherein said potentiometer is mounted to said third spur gear.

13. The powered garage door opener as set forth in claim 12 further including a pair of spaced apart first and second gear support plates for rotatably supporting said second and third spur gears therebetween.

14. The powered garage door opener as set forth in claim 13 further including an electrical connector electrically connected between said potentiometer and said control module for providing the rotational position of said second spur gear to said control module.

15. A powered garage door opener for operating a garage door between an open and closed position, the powered garage door opener, comprising:
  a main housing adapted to be mounted adjacent to the garage door;
  an electric motor and gear train assembly mounted within the main housing and adapted to be operatively coupled to the garage door to drive the garage door between the open and closed positions; a power supply mounted within the main housing and electrically coupled to the electric motor and gear train assembly;
  a control module mounted with said main housing and electrically coupled to the power supply and the electric motor and gear train assembly for controlling selective actuation of the electric motor and gear assembly; and
  a lock assembly configured to enable locking and unlocking of the garage door in the closed position;
  wherein the electric motor and gear train assembly includes an electric motor, a worm gear coupled to and driven by the electric motor, a spur gear in meshed engagement with the worm gear, and a driven shaft mounted to the spur gear and adapted to be coupled to the garage door, wherein the electric motor provides electrical power to drive the worm and spur gears for rotating the driven shaft to provide powered actuation of the garage door, and wherein the gear relationship between the worm gear and the spur gear allows the spur gear to back drive the worm gear and provide manual actuation of the garage door, and wherein the control module is operable for selectively shifting the lock assembly between a locked condition and an unlocked condition to selectively permit movement of the garage door between the closed and open positions.

\* \* \* \* \*